Dec. 12, 1933.         C. F. RAUEN.         1,939,226
MECHANISM FOR POWER TRANSMISSION
Filed Sept. 29, 1930     3 Sheets-Sheet 1

INVENTOR.
Carl F. Rauen.
BY
ATTORNEYS.

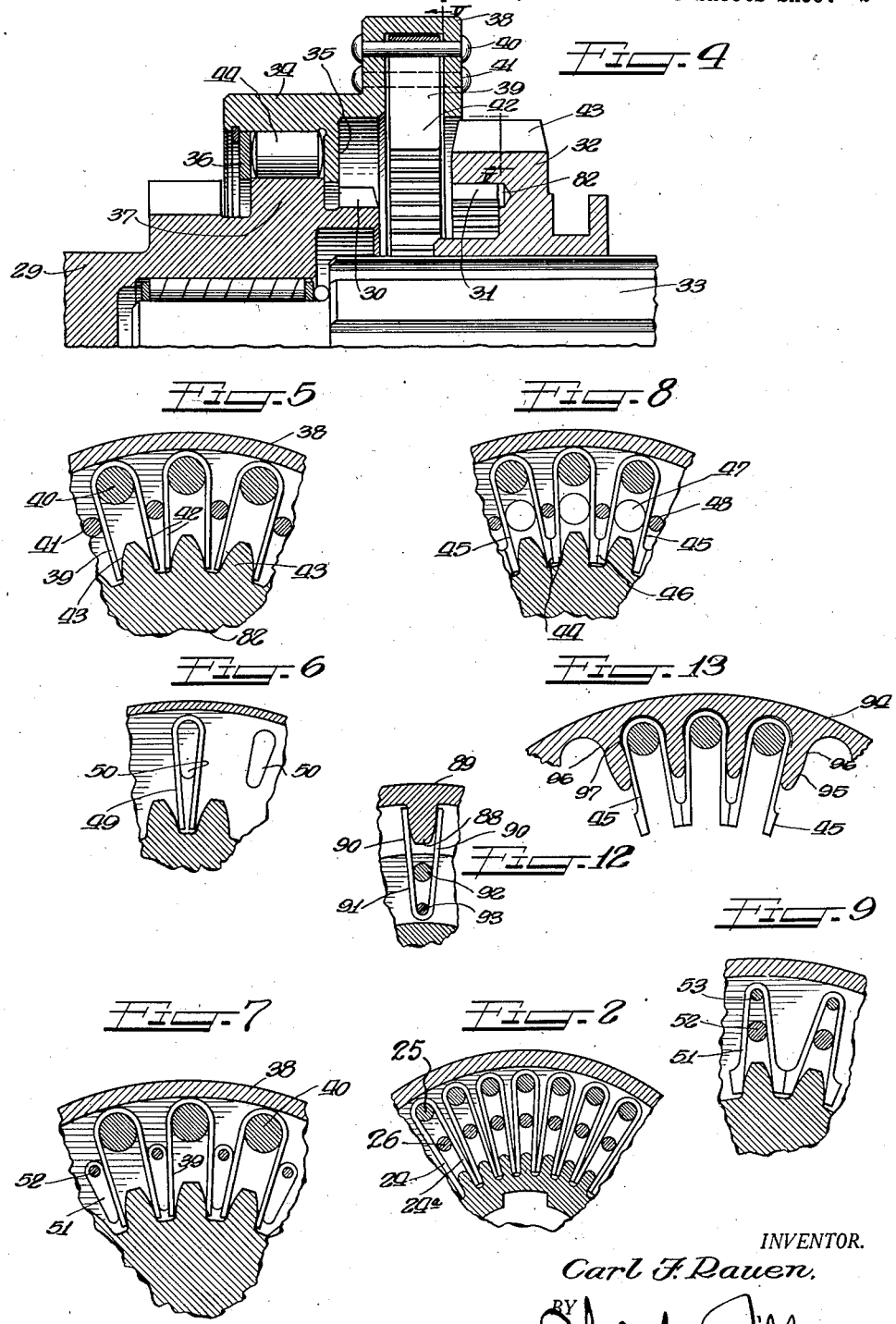

Dec. 12, 1933.   C. F. RAUEN   1,939,226
MECHANISM FOR POWER TRANSMISSION
Filed Sept. 29, 1930   3 Sheets-Sheet 3
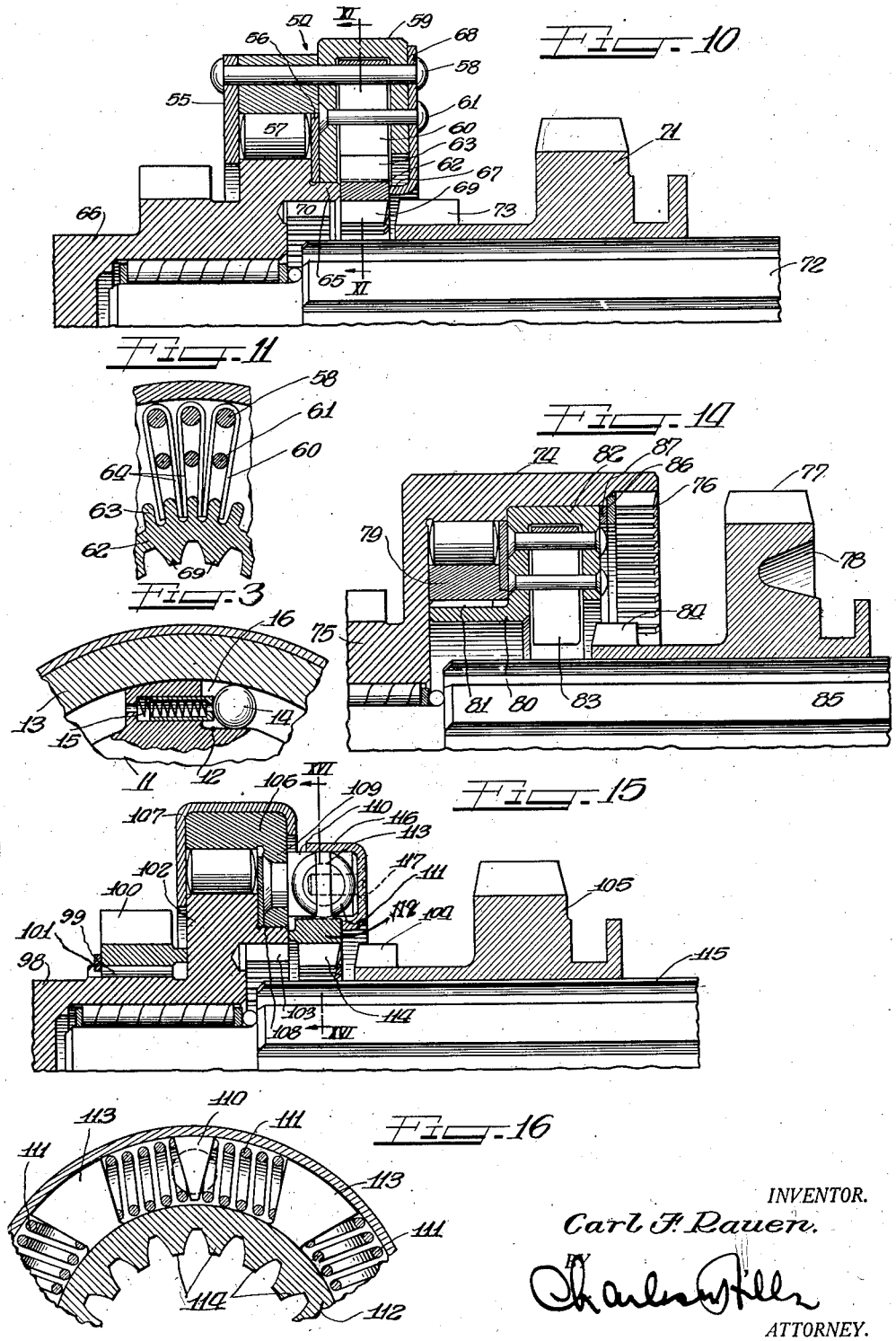
INVENTOR.
Carl F. Rauen.
ATTORNEY.

Patented Dec. 12, 1933

1,939,226

UNITED STATES PATENT OFFICE 1,939,226

MECHANISM FOR POWER TRANSMISSION

Carl F. Rauen, Detroit, Mich.

Application September 29, 1930
Serial No. 485,071

30 Claims. (Cl. 192—48)

This invention relates to power transmission systems.

An undesirable feature in transmissions of the character now generally in use resides in the fact that when the speed of the vehicle shaft tends to exceed that of the engine shaft, the engine acts as a brake or "drag". This is particularly noticeable when the car is moving at high speeds, although this action of the engine makes itself felt whenever the momentum of the vehicle tends to drive the propeller shaft at a greater speed than the engine. This action is due to the fact that when the transmission gears are set for a given drive, the connection between the driving shaft and the driven shaft is such that they must move together, regardless of direction or speed.

When driving on the open road, at relatively high speed, it is often desirable to release the accelerator and at the same time continue at substantially the same speed as that acquired immediately before releasing the accelerator, that is, to coast or free wheel.

Attempts have heretofore been made to accomplish the above end by changes in the transmission structure but these attempts have involved more or less complicated constructions, often requiring a complete reorganization of conventional transmissions and entailing manufacturing costs which are prohibitive. In these constructions, moreover, some form of one-way clutch is provided in order to make possible the rotation of the propeller shaft without the engine shaft acting as a brake, yet permitting the engine shaft to drive the propeller shaft when the speed of the former tends to exceed that of the latter. It will be appreciated that in these constructions a distinct shock occurs, while the car is free wheeling or coasting, when an attempt is made to reinstate the drive from the engine to the vehicle. That is, when the shafts are connected for the free wheeling relation, and the accelerator is actuated to speed up the engine shaft, the latter overtakes the propeller shaft with considerable force, which, repeated often enough, will cause serious damage to the overrunning clutch parts.

It is accordingly one of the principal objects of my invention to provide a new and improved transmission system involving a minimum of changes of conventional structure in such systems, which is capable of performing all of the functions desired in a free wheeling device, and yet enables the reinstatement of the driving relations between the drive shaft and the propeller shaft while the shafts are set for free wheeling, in such a manner as to entirely absorb the shock caused by such reinstatement, thereby greatly prolonging the life of the parts.

A further object of the invention resides in the provision of a shock absorbing free wheeling device which makes possible the shifting from the next lower speed to the free wheeling drive without necessitating the use of the engine clutch.

In carrying out my invention into practice, I provide a pair of clutch elements relatively movable in one direction for one-way drive purposes, one of the clutch parts being fixedly secured to the engine shaft and the other being spaced from the first by means of spring pressed rollers or similar clutch means, such other parts being provided with yieldable clutch teeth engageable with teeth on the slidable second speed gear. With this arrangement the engagement between the loosely mounted clutch part and the teeth of the slidable gear is instantaneous but yielding to thereby absorb the shock occasioned by the sudden clutching of the clutch parts for the one-way drive. My invention may be carried out by the employment of other forms of yielding drive, wherein for example, check valve means is employed in connection with fluid trapped between the clutch parts so that the drive from the engine shaft to the propeller shaft will be graduated instead of instantaneous.

An outstanding advantage of my invention resides in the fact that it may be applied to the conventional type of transmission with a very small change in its structure, and the parts are so extremely simple, that they may be manufactured at a very low cost and may be readily assembled and disassembled. The load borne by these parts is quite small in view of the fact that they come into play for the most part at higher speeds so that the parts may be of light construction if so desired. Moreover, it will be noted that with a transmission embodying my invention, the vehicle may be operated so as to take advantage of the free wheeling or coasting feature, or not, depending upon the will of the driver, and the additional effort required in setting up the two-way direct drive is practically negligible.

Another advantage of no little importance in connection with my construction lies in the fact that because of the small amount of momentum imparted to the loosely mounted clutch element, which carries the teeth by which the shafts are connected for the free wheeling direct drive, the shift from second speed to this drive is made possible without the operation of the engine clutch, thereby eliminating the operation now necessary in transmissions in present day use.

Other and further important objects and advantages of this invention will be apparent from the disclosure in the specification and accompanying drawings.

This invention (in a preferred form) is illustrated in the drawings and hereinafter more fully described.

On the drawings:

Figure 2 is a fragmentary sectional view taken approximately as indicated at II—II in Figure 1.

Figure 3 is an enlarged fragmentary sectional view taken approximately as indicated by the line III—III in Figure 1, certain parts being shown in elevation.

Figure 4 shows a somewhat modified form of the construction appearing in Figure 1.

Figure 5 is a view taken approximately as indicated at V—V in Figure 4.

Figures 1, 17, 18:
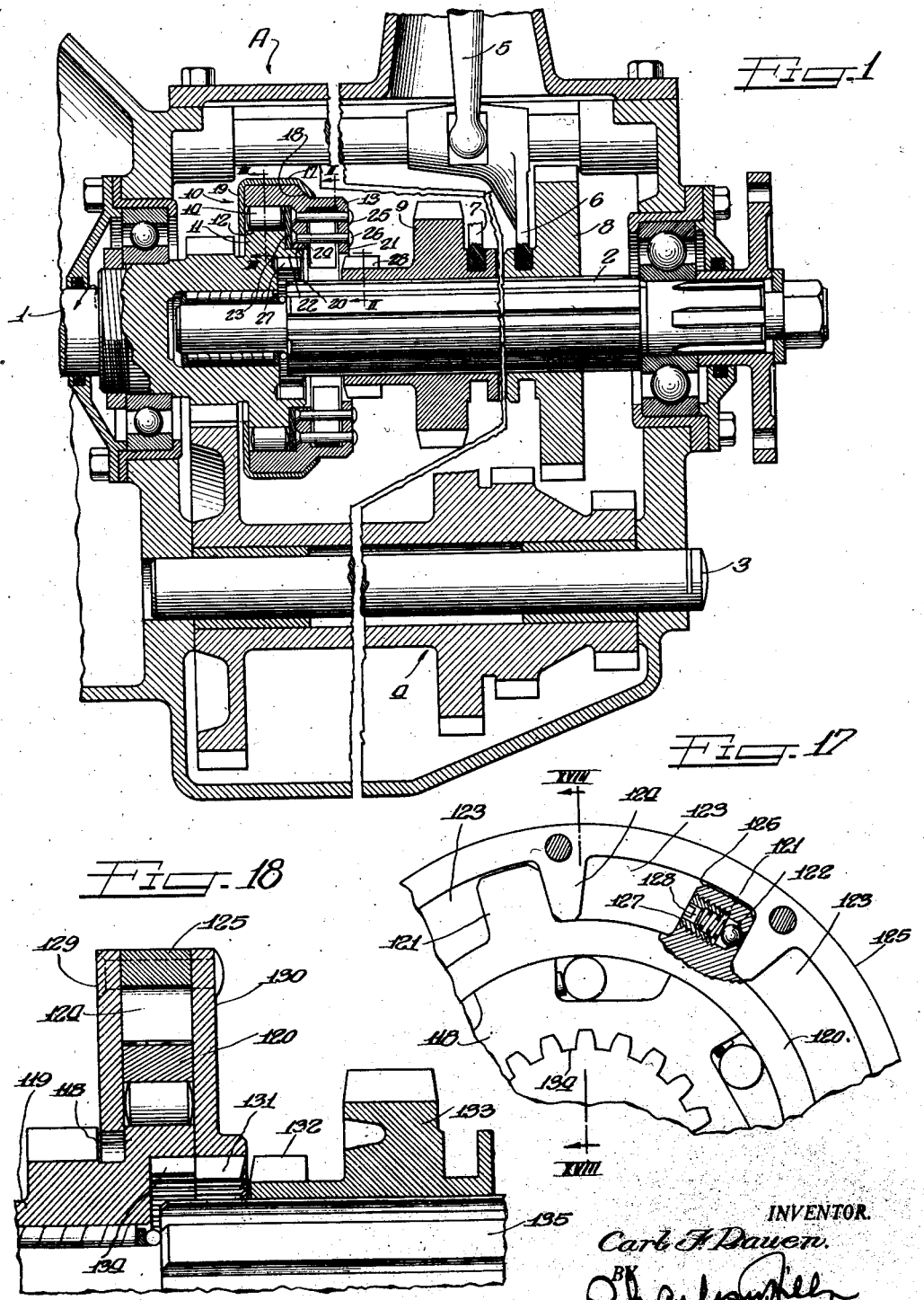
Figure 1 is a fragmentary sectional view through a transmission constructed in accordance with my invention, showing one form of my overrunning shock absorbing clutch employing U-shaped spring elements.

Figures 6 to 14 inclusive, show further forms of the invention wherein substantially U-shaped spring shock absorbing means is employed.

Figure 15 depicts the use of coiled springs in my improved overrunning clutch device.

Figure 16 is a view taken substantially in the plane indicated by the line XVI—XVI in Figure 15.

Figure 17 shows a hydraulic shock absorbing clutch mechanism made in accordance with the invention.

Figure 18 is a view taken approximately in the plane indicated at XVIII—XVIII in Figure 17.

Referring now more particularly to the drawings wherein the same parts are indicated by identical characters, I designate the transmission generally at A, including a drive or engine shaft 1, a driven or propeller shaft 2, a countershaft 3, a counter shaft cluster of gears 4, and a gear shift lever 5 with its accompanying shift forks 6 and 7 for sliding the slidable gears 8 and 9, all in general use in the conventional type of transmission. A shock absorbing one-way clutch mechanism, indicated generally at 10, serves to connect the shafts 1 and 2 for a one-way direct drive or a two-way direct drive, according to the will of the operator. With this shock absorbing arrangement, the shock on the overrunning clutch occasioned when the engine is suddenly speeded up when the car is coasting at an appreciably faster speed than the engine, is reduced to such an extent that there will be no damage to the parts even though this action is repeated numerous times, all of which will appear as the description proceeds.

The clutch mechanism, indicated at 10 in Figure 1, comprises a member 11 having a cam surface 12 and formed integral with or otherwise securely fastened to the drive shaft 1, and a clutch shell 13 located concentrically with respect to the shaft 1 over the cam member 11 and separated therefrom at intervals by rollers 14 which are urged by springs 15 in a direction to occupy the small parts of the pockets 16 formed by the juxtaposed walls of the shell 13 and the cam member 11. A plate 17 is spun over the shoulder 18 of the shell 13 and is provided with an inwardly extending flange 19 which closes one side of each pocket 16, thereby preventing escape of the rollers 14 through that side, the flange 19 also overlapping the cam member 11. The shell 13 is further provided with a pair of spaced inwardly extending flanges 20 and 21, the flange 20, by reason of its rotatable fit around the extension 22 of the cam member 11, serving to center the shell. A ring 23, located between the flange 20 and the cam member 11, serves to guide the rollers 14 as well as limit their axial movement. It will be apparent, then, that the flange 19 of the plate 17 and the flange 20 of the clutch shell 14 serve to maintain the clutch parts against axial separation.

A circular series of spring elements 24 is secured between the flanges 20 and 21, by means of pins 25 and 26. The spring elements 24 are preferably substantially U-shaped with their ends extending inwardly toward the axis of the member on which they are mounted, the pins 25 occupying the bight portions of the springs, and the pins 26 being located substantially centrally between the consecutive springs.

The shaft 1 is provided with internal teeth 27 which are adapted for substantial alignment with the extremities of the arms of the spring members 24, which extremities constitute in fact teeth engageable by the clutch teeth 28 of the sliding gear 9. A glance at Figure 2, for example, will illustrate how the spring elements are arranged so that their extremities may serve as clutch teeth.

With the arrangement just described, and referring particularly to Figure 1, it will be apparent that when the teeth 28 are shifted so as to interengage with the extremities of the spring elements 24, in response to shift of the lever 5 to a position corresponding to direct drive in conventional transmissions, a free wheeling drive will be set up between the shafts 1 and 2, that is, the shaft 2 will be permitted to rotate independently of the shaft 1 when the vehicle is being driven by its own momentum, so that the engine will not act as a brake or drag on the shaft 2. The arrangement of the springs in Figure 1 and the manner in which they are engaged by the teeth 28 on the sliding gear 9 are shown clearly in Figure 2. The clutch shell being loosely mounted, the shift of the teeth 28 into mesh with the extremities of the spring members 24 may be brought about without operation of the main engine clutch. Whenever it is desired to establish the two-way direct drive between the shafts 1 and 2, it is necessary merely to subject the lever to an extended shift or overshift so that the teeth 28 are brought into mesh with the teeth 27 on the shaft 1.

In Figures 4 and 5 a slightly modified form of the invention is illustrated, the shaft 29 being provided with external teeth 30 engageable with the internal teeth 31 of the slidable gear 32 mounted on the transmission shaft 33, the clutch shell 34 being provided with an inwardly extending flange 35, cooperating with the ring 36 to hold the member 37 and the shell 34 against relative axial movement. The shell 34 is provided with an enlarged substantially U-shaped portion 38 in which the clutch teeth forming spring elements 39 are held in place by pins or rivets 40 and 41. It will be apparent from the disclosure that each pair of contiguous or juxaposed arms 42 of consecutive spring elements 39 constitutes a tooth and the teeth thus formed are engageable by the teeth 43 of the slidable gear 32. It will be noted that the teeth 30 are offset from the plane containing the spring elements 39, and that the clutch teeth 31 on the slidable gear 32 are arranged in a plane which contains the teeth 43 of the slidable gear 32. Thus the teeth 43, when engaged with the teeth formed by the spring elements 39, set up through the rollers 44 a one-way direct drive providing free wheeling between the shafts 29 and 33, and the engagement of the teeth 31 with the teeth 30 in response to an overshift of the gear shift lever serves to short-circuit the one-way direct drive and establish a two-way direct drive between the shafts 29 and 33. It will be evident especially from Figure 4 that the resistance offered by the teeth 43 due to the inertia of the propeller shaft will cause the arms 42 to be flexed by the pins 41, so that, should the engine shaft 29 be suddenly speeded up while the gears are set for the one-way or free wheeling drive, the shock normally occasioned by such speeding up of the engine will be absorbed by the spring arms 42.

The arrangement of the various parts of my novel shock absorbing free wheeling clutch mechanism may be varied in many ways as shown in Figures 4 to 14 inclusive, similar spring elements being availed of in each case.

In Figure 8, the arrangement is very similar to that shown in Figures 4 and 5 except that the ends 44 of the spring elements 45 are enlarged and present juxtaposed flat surfaces 46, the friction between these surfaces helping to reduce the shock referred to above. Spacers 47 located between the arms of each spring element 45 and 48 disposed between the elements themselves serve to stiffen the spring elements, although either the spacers 47 or 48 may be omitted.

In Figure 6, spring elements 49 similar to those shown at 39 in Figures 4 and 5 are employed, the spacing pins being replaced by integral wedge shaped members 50 which by reason of their length, lend rigidity to the spring elements.

The arrangement in Figure 7 embodies a combination of the structures of Figures 5 and 6, the wedge members 51 being pivotally mounted on the pins 52.

Figure 9 shows a form similar to that shown in Figure 8, the spring elements 51 being substantially V-shaped, and the spacing elements 52 and 53 being located between the arms of each spring element 51.

In Figure 10 the shell member indicated generally at 54 is built up of a plurality of parts, including cooperating rings 55 and 56 to guide the rollers 57 and hold the same from falling out. A ring member substantially U-shaped in cross-section, held to the remaining parts of the shell by means of rivets or the like 58, is indicated at 59 and receives a circumferential series of spring elements 60, the arms of each element being spaced apart by rivets 58 and pins 61. A ring member 62 is provided with external clutch teeth 63 which are in constant engagement with the teeth formed by the juxtaposed arms 64 of the spring elements 60, the ring member 62 being held in place laterally by the extension 65 of the shaft 66 and by the inturned flange 67 of the plate 68. The ring member 62 is provided with internal teeth 69 which are adapted to be in substantial alignment with the internal teeth 70 of the shaft 66, and of substantially the same configuration and the slidable gear 71 on the propeller shaft 72 is provided with external teeth 73 of a configuration complemental to the teeth 69 and 70. Upon shift of the shift lever to the position which it would ordinarily occupy to establish direct drive, the external teeth 73 will be meshed with the internal teeth 69, whereby, through the medium of the rollers 57, a one-way or free wheeling direct drive will be established between the shafts 66 and 72, the spring elements 60 serving to absorb any shock that may be occasioned by the sudden increase in speed of the engine shaft 66 for driving the vehicle from the engine. Upon an extended shift or overshift of the gear shift lever, provision for which is made by suitable modification in the gear shifting mechanism, the external teeth 73 will be meshed with the internal teeth 70 of the shaft 66, thereby short-circuiting the one-way direct drive and establishing a two-way direct drive between the shafts 66 and 72, this drive being the same as that now obtained for direct drive in conventional transmission systems.

In the forms of the invention thus far illustrated, the inside clutch member is integral with the drive shaft, while the outer clutch member is loosely mounted. In Figure 14, however, this arrangement is reversed, the clutch shell 74 being formed integral with the drive shaft 75 and is provided with positive drive clutch teeth 76, adapted to mesh with the gear teeth 77 on the sliding gear 78. The cam member 79 of the overrunning clutch is splined on the annular member 80 at 81. The member 80 is centered in the shell 74 at 82 and is provided with spring members 83 similar to the spring members 60 in Figures 10 and 11, said spring members being adapted to be clutched with the teeth 84 of the gear 78 for a one-way drive between the shafts 75 and 85 through the overrunning clutch. The member 80 is held in place by the washer 86 and snap ring 87. The two-way direct drive between the shafts 75 and 85 is set upon an overshift of the gear shift lever, causing the clutching of the teeth 76 and 77.

In the previous illustrations of my invention, the teeth on the sliding gear are arranged for clutching engagement with the spring elements from the inside. In Figure 12 is shown a form of the invention wherein the teeth are located internally on the slidable gear. In this view the slidable gear 89 is provided with internal teeth 88, which teeth are received between the outwardly extending arms 90 of the spring elements 91, said arms being spaced apart by the pins 92 and 93 and diverging radially outwardly.

Figure 13 provides an arrangement similar to that shown in Figure 8, including spring elements 45 connected to the clutch member 94 by means of pins as in Figure 8. The clutch member 94 has teeth 95 fitting between adjacent spring elements and narrowed at their roots 96 to provide play at 97. The ends of the spring elements 45 are formed to provide teeth for meshing with the teeth of the slidable gear on the propeller shaft as shown in Figure 8.

Figures 15 and 16 illustrate a shock absorbing free-wheeling clutch mechanism employing coiled springs. In this form of the invention, the drive shaft 98 has splined thereto at 99 the drive gear 100, which is held in place by the snap ring 101. The drive shaft 98 has formed integral therewith a cam member 102 of the overrunning clutch. This member is provided with positive drive clutch teeth 103 adapted to mesh with the teeth 104 on the slidable gear 105 for a two-way direct drive between the engine and propeller shafts. The shell member 106 of the overrunning clutch is held in place by the plate 107 and is centered on the cam member 102 at 108. The shell member 106 is provided with an integral flange 109 in which are riveted the wedge shaped parts 110 which serve as drive members for the springs 111. A ring member 112, adapted to cooperate with the springs 111 by means of lugs or wedges 113 formed thereon, has internal clutch teeth 114 adapted to mesh with the teeth 104 on the sliding gear 105, for a one-way drive from the shaft 98 to the shaft 115. The part 116 holds the member 112 in place by means of screws 117 threaded into the parts 110. It will be seen from the foregoing that when the teeth 114 are clutched with the teeth 104 of the slidable gear 105, a shock absorbing free wheeling drive is established between the shafts 98 and 115, and upon overshift of the shift lever to bring about a clutching engagement between the teeth 103 and the teeth 104, the shafts 98 and 115 will be connected for a direct two-way drive.

In Figures 17 and 18 is shown a hydraulic type of shock absorbing drive in connection with a transmission system employing a free wheeling mechanism. In this arrangement the cam member 118 of the overrunning clutch is formed integral with the drive shaft 119. The shell member 120 of the overrunning clutch has lugs 121 in which are located check valves 122 to prevent fluid trapped in the space 123 formed by the lugs 121 of the shell 120 and the lugs 124 formed in the ring 125 from passing to the far side of said lugs 121, except by passing through the restricted space 126. Each screw 127 is provided with a hole 128 through which the fluid can pass to the left side (Figure 17) of the lug 121 when the car is coasting so as to be ready to receive the shock when power is applied suddenly to the engine and transmitted through the one-way clutch to the shell 120. On each side of the ring 125 is riveted a plate, the plates being designated as 129 and 130, and serving to position the shell member 120 of the overrunning clutch as well as to retain the fluid in the spaces 123. The plate 130 is provided with clutch teeth 131 adapted to clutch with the teeth 132 on the slidable gear 133 for a one-way direct drive connection. The teeth 132 are also adapted to clutch with the teeth 134 formed on the cam member 118 for establishing a two-way direct drive between the shafts 119 and 135.

From the foregoing it will be apparent that I have provided shock absorbing means incorporated in a free wheeling clutch mechanism whereby shock incident to the sudden application of power while the driving and driven shafts are set for the free wheel drive will be absorbed without damage to the clutch parts. Moreover, the clutch mechanism itself provides for the selective establishment of a one-way or a two-way drive between the shafts and by reason of the yielding character of one of the clutch elements, clashing of the clutch teeth for establishment of the one-way or free wheeling drive is obviated.

I am aware that numerous details of construction may be varied through a wide range without departing from the principles of this invention, and I, therefore, do not purpose limiting the patent granted hereon, otherwise than necessitated by the prior art.

I claim as my invention:

1. In a transmission mechanism of the class described, drive and driven members, a one-way clutch mounted on one of said members and having an overrunning part provided with yieldable teeth, toothed means mounted for rotation with the other member, said means and teeth being relatively movable in an axial direction into interengagement for establishing a shock absorbing one-way drive between said members.

2. In a transmission of the class described, a drive member having clutch teeth, a one-way clutch mounted thereon and including an overrunning part having an internal annular groove, a plurality of resilient elements mounted at one end in the groove, the free ends of said elements being disposed substantially radially inwardly, means disposed between said elements and intermediate the ends thereof, and constituting points about which said ends are adapted to be flexed, the ends of each pair of consecutive elements constituting a clutch tooth, a driven member, a toothed part slidably splined thereon and adapted to be clutched with the teeth of said elements to establish a shock absorbing one-way drive between the members, in response to shift of the gear shift lever, and to be clutched with the drive member teeth to establish a two-way drive between said members in response to an overshift of the lever.

3. In a transmission of the class described, drive and driven members, a one-way clutch mechanism for said members, said mechanism including resilient elements arranged in slidably engaged pairs, each pair constituting a clutch tooth, clutch teeth on one of the members for inter-engaging said elements and adapted to flex said elements incident to an application of power to one of said members, the friction between the slidable elements serving to further absorb the resulting shock.

4. In a transmission of the class described, a drive member having clutch teeth, a one-way clutch having means for rendering the same instantaneously acting, said clutch including an overrunning part having flexible teeth adapted for alignment with the first named teeth, a driven member, a part slidably splined thereon and having clutch teeth engageable first with the flexible teeth for a one-way drive and then with the teeth of the drive member for a two-way drive between said members.

5. In a transmission system of the class described, a drive member, a one-way clutch carried thereby and including an overrunning part having a plurality of circumferentially spaced lugs, a ring element having a plurality of lugs disposed intermediate and in spaced relation to the first named lugs, spring means maintaining the lugs out of contact with one another and resisting relative movement therebetween, means maintaining the overrunning part and said element against relative axial movement, said ring element having clutch teeth, a driven member, a toothed part splined thereon and slidable into clutching engagement with the spring element clutch teeth to establish a one-way drive between said members, said spring means serving to absorb shocks incident to sudden applications of power to the drive member.

6. In a transmission system of the class described, a drive member, a one-way clutch carried thereby and including an overrunning part having a plurality of circumferentially spaced lugs, a ring element having a plurality of lugs disposed intermediate and in spaced relation to the first named lugs, spring means maintaining the lugs out of contact with one another and resisting relative movement therebetween, means maintaining the overrunning part and said element against relative axial movement, said ring element having clutch teeth, a driven member, a toothed part splined thereon and slidable into clutching engagement with the ring element clutch teeth to establish a one-way drive between said members, said spring means serving to absorb shocks incident to applications of power to the drive member, said drive member having teeth adapted to align with the teeth of the ring element and being engageable by the teeth of the slidable part in response to an overshift of the gear shift lever to establish a two-way drive between said members.

7. In a transmission system of the class described, drive and driven instrumentalities, a pair of parts having interlocking lugs, yieldable means spacing the lugs from one another, one of said parts having an overrunning relation to one of said instrumentalities, and means for coupling said instrumentalities directly, or indirectly through the other of said parts, for establishing selectively a two-way or a cushioned one-way drive between said instrumentalities.

8. In a transmission system of the class described, drive and driven instrumentalities, a pair of parts having interlocking lugs, yieldable means spacing the lugs from one another, one of said parts having an overrunning relation to one of said instrumentalities, and means for coupling said instrumentalities directly, or indirectly through the other of said parts, for establishing selectively a two-way or a cushioned one-way drive between said instrumentalities, and a device for preventing separation of said parts.

9. In a transmission system of the class described, drive and driven instrumentalities, a pair of parts shiftable circumferentially relative to each other and having interlocking lugs, yieldable means spacing the lugs from one another, one of said parts having an overrunning relation to one of said instrumentalities, and means for coupling said instrumentalities directly, or indirectly through the other of said parts, for establishing selectively a two-way or a cushioned one-way drive between said instrumentalities.

10. In a transmission device of the class described, drive and driven instrumentalities, relatively movable parts, means including a hydraulic shock absorbing system associated with said parts for yieldably resisting relative movement between said parts, one part having a one-way drive connection with one instrumentality, and means for positively connecting the other part with the other instrumentality, whereby to establish a shock-absorbing one-way drive between said instrumentalities.

11. In a transmission of the class described, drive and driven instrumentalities, a part having a one-way drive connection with one instrumentality and provided with a liquid chamber, a second part including a piston disposed in said chamber, means providing for leakage of liquid beyond said piston, whereby said parts are rendered relatively movable, and means for positively connecting the second part to the other instrumentality to thereby establish a shock absorbing one-way drive between said instrumentalities.

12. In a transmission of the class described, drive and driven instrumentalities, a plurality of parts having circumferential series of lugs, the lugs of one part being located between and slightly longer than the lugs of the other part, the space between each pair of consecutive lugs on the one part containing fluid and being greater than the space occupied by the intervening lug, whereby the lugs of the other part constitute pistons beyond which the fluid is adapted to leak so that the parts are relatively movable, one part having an overrunning connection with one instrumentality and means for connecting the other part to the other instrumentality for establishing a one-way shock absorbing drive between said instrumentalities.

13. In a transmission of the class described, drive and driven instrumentalities, a part having a one-way drive connection with one instrumentality and provided with a plurality of circumferentially spaced liquid containing chambers, a second part including a plurality of pistons disposed in said chambers, means providing for leakage of liquid beyond said pistons whereby the parts are rendered relatively movable, and means for connecting the second part to the other instrumentality to thereby establish a shock absorbing one-way drive between said instrumentalities.

14. In a transmission of the class described, drive and driven instrumentalities, a plurality of parts having circumferential series of lugs, the lugs of one part being located between and slightly longer than the lugs of the other part, the space between each pair of consecutive lugs on the one part containing fluid and being greater than the space occupied by the intervening lugs, whereby the lugs of the other part constitute pistons beyond which the fluid is adapted to leak, one of said parts having an overrunning connection with the driving instrumentality, and means for connecting the other part positively to the driven instrumentality for establishing a one-way shock absorbing drive between said instrumentalities.

15. In a transmission system of the class described, drive and driven members, a pair of parts, yieldable means associated with said parts for affording a shock absorbing drive therebetween, one of said parts having an overrunning relation to one of said members, and means for coupling said members directly, or indirectly through the other of said parts, for establishing selectively a two-way or a cushioned one-way drive between said members.

16. In a transmission system of the class described, drive and driven members, a pair of parts, yieldable means associated with said parts for affording a shock absorbing drive therebetween, said parts having an overrunning relation to one of said members, and means for coupling said members directly, or indirectly through said parts, for establishing selectively a two-way or a cushioned one-way drive between said members.

17. In a transmission system of the class described, drive and driven members, a pair of parts, yieldable means associated with said parts for affording a shock absorbing drive therebetween, one of said parts having an overrunning relation to one of said members, means for coupling said members directly, or indirectly through the other of said parts, for establishing selectively a two-way or a cushioned one-way drive between said members, and a device for preventing separation of said parts.

18. In a transmission system of the class described, drive and driven members, a pair of parts, yieldable means associated with said parts for affording a shock absorbing drive therebetween, said parts having an overrunning relation to one of said members, means for coupling said members directly, or indirectly through said parts, for establishing selectively a two-way or a cushioned one-way drive between said members, and a device for preventing separation of said parts.

19. In a transmission system of the class described, drive and driven members, a pair of parts shiftable circumferentially relative to each other, yieldable means affording a cushioned drive between said parts, one of said parts having an overrunning relation to one of said members, and means for coupling said members directly, or indirectly through the other of said parts, for establishing selectively a two-way or a cushioned one-way drive between said members.

20. In a transmission system of the class described, drive and driven members, a pair of parts shiftable circumferentially relative to each other, yieldable means affording a cushioned drive between said parts, said parts having an overrunning relation to one of said members, and means for coupling said members directly, or indirectly through said parts, for establishing selectively a two-way or a cushioned one-way drive between said members.

21. In a transmission of the class described, a drive member having clutch teeth, a one-way clutch mounted thereon and including an overrunning part having mounted thereon a plurality of substantially radially extending yieldable teeth, a driven member, a toothed part slidably splined thereon and capable of clutching engagement with said yieldable teeth to establish a shock absorbing one-way drive between said members, and of being clutched with the drive member teeth to establish a two-way drive between said members.

22. In a motor vehicle transmission mechanism, a drive member, a one-way clutch mounted thereon and including an overrunning part provided with substantially radially extending yieldable teeth, and a driven member having teeth slidable into engagement with the yieldable teeth whereby a shock absorbing one-way drive may be established between said members.

23. In a motor vehicle transmission mechanism, a drive member, a one-way clutch mounted thereon and including an overrunning part provided with substantially radially extending yieldable teeth, and a driven member having teeth for engagement with the yieldable teeth whereby a shock absorbing one-way drive may be established between said members, said drive member having clutch teeth and said driven member being engageable with the yieldable teeth in response to shift of the gear shift lever, and with the drive member teeth in response to an overshift of the lever.

24. In a motor vehicle transmission, drive and driven members, a one-way clutch for said members, said clutch including substantially radially extending yieldable elements arranged in pairs, each pair constituting a clutch tooth, clutch teeth on one of the members for interengaging said elements and adapted to cause said elements to yield incident to an application of power to one of said members.

25. In a motor vehicle power transmission, a drive member having clutch teeth, a driven member having clutch teeth, a device associated with said members for establishing a one way drive therebetween, said device including an overrunning part and yieldable clutch tooth means carried by said part, one of said members being shiftable for clutching engagement with said means to establish a cushioned one-way drive between said members and with the other member to establish a two-way drive therebetween.

26. In a transmission mechanism of the class described, a one-way clutch having relatively overrunning parts, one of said parts being provided with yieldable teeth, and a toothed member for cooperating with said teeth, said member and teeth being relatively movable in an axial direction into interengagement for establishing a shock absorbing one-way drive between said member and the other part.

27. In a transmission mechanism of the class described, a one-way clutch having relatively overrunning parts, one of said parts being provided with yieldable teeth, and a toothed member for cooperating with said teeth, said member and teeth being relatively movable in an axial direction into interengagement for establishing a shock absorbing one-way drive between said member and the other part, said member and teeth being coaxially arranged.

28. In a motor vehicle power transmission mechanism, drive and driven members having complemental clutch teeth, a one-way clutch mounted on one of said members and including an overrunning part, a second part, resilient means between and interlocked with said parts, the second part and the other member having complemental clutch teeth, and means for supporting said members for relative movement, whereby upon approach of said members, a shock absorbing one-way drive through said parts and a two-way drive independently of said parts may be selectively established between said members.

29. In a motor vehicle power transmission mechanism, drive and driven members having complemental clutch teeth, a one-way clutch mounted on one of said members and including an overrunning part, a second part, resilient means between and interlocked with said parts, the second part and the other member having complemental clutch teeth, and means for supporting said members for relative movement, whereby upon approach of said members, a shock absorbing one-way drive through said parts and a two-way drive independently of said parts may be selectively established between said members, the clutch teeth of the second part being arranged for engagement with the complemental teeth of the other member before engagement of the complemental teeth of the members, from a neutral relation of said members, whereby the latter engagement is facilitated.

30. In a motor vehicle power transmission mechanism, drive and driven members, a one-way clutch mounted on one of said members and including an overrunning part, means secured to said part and including a circular series of torque transmitting resilient radial teeth, a ring-like part of relatively rigid material interlocked with said radial teeth, and means maintaining said parts and resilient means against separation, the second part and the other member having complemental clutch teeth engageable to establish a cushioned one-way drive between said members.

CARL F. RAUEN.